United States Patent
Mi

(10) Patent No.: US 9,563,611 B2
(45) Date of Patent: Feb. 7, 2017

(54) MERGING WEB PAGE STYLE ADDRESSES

(71) Applicant: Alibaba Group Holding Limited, George Town (KY)

(72) Inventor: Zhiwen Mi, Hangzhou (CN)

(73) Assignee: Alibaba Group Holding Limited (KY)

( * ) Notice: Subject to any disclaimer, the term of this patent is extended or adjusted under 35 U.S.C. 154(b) by 79 days.

(21) Appl. No.: 14/219,932

(22) Filed: Mar. 19, 2014

(65) Prior Publication Data
US 2014/0289612 A1    Sep. 25, 2014

(30) Foreign Application Priority Data

Mar. 22, 2013    (CN) .......................... 2013 1 0095228

(51) Int. Cl.
G06F 17/27    (2006.01)
G06F 17/22    (2006.01)
G06F 17/30    (2006.01)

(52) U.S. Cl.
CPC ..... *G06F 17/2247* (2013.01); *G06F 17/30887* (2013.01); *G06F 17/30905* (2013.01)

(58) Field of Classification Search
CPC .............. G06F 17/2247; G06F 17/2252; G06F 17/30876; G06F 17/30899
See application file for complete search history.

(56) References Cited

U.S. PATENT DOCUMENTS

| 5,944,790 A | 8/1999 | Levy |
| 8,250,457 B2 | 8/2012 | Fainberg et al. |
| 8,612,881 B2 | 12/2013 | Kim et al. |
| 2009/0217145 A1* | 8/2009 | Watson ............ G06F 17/30905 715/202 |
| 2010/0223322 A1 | 9/2010 | Mott et al. |

FOREIGN PATENT DOCUMENTS

| CN | 102622376 | 8/2012 |
| EP | 2400407 | 12/2011 |

* cited by examiner

*Primary Examiner* — Stephen Hong
*Assistant Examiner* — Broderick Anderson
(74) *Attorney, Agent, or Firm* — Van Pelt, Yi & James LLP

(57) ABSTRACT

Embodiments of the present application relate to a method for merging web page style addresses, a device for merging web page style addresses, and a computer program product for merging web page style addresses. A method for merging web page style addresses is provided. The method includes receiving a web page request from a client terminal, determining web page content data based on the web page request, extracting a plurality of pieces of style data from the web page content data, each piece of the style data including a style address and a style attribute, and merging a plurality of style addresses to obtain one or more composite style addresses.

14 Claims, 6 Drawing Sheets

200

500

MERGING WEB PAGE STYLE ADDRESSES

CROSS REFERENCE TO OTHER APPLICATIONS

This application claims priority to People's Republic of China Patent Application No. 201310095228.9 entitled A METHOD AND DEVICE FOR MERGING WEB PAGE STYLE ADDRESSES, filed Mar. 22, 2013 which is incorporated herein by reference for all purposes.

FIELD OF THE INVENTION

The present application relates to a method and system for merging network style addresses.

BACKGROUND OF THE INVENTION

As the Internet enters the Web 2.0 era, front-end page performance of web servers is becoming more demanding as the number of applications increases. When a user uses the Internet, typically the user browses web pages using a browser. The web pages have elements such as text and graphics. The web pages are identified and accessed through uniform resource locators (URLs). A URL is a web address for locating a web page formatted in Hypertext Markup Language (HTML) and describes addresses of Internet pages and other Internet resources. When designing web pages, designers create style designs (e.g., web page layout, fonts, colors, backgrounds, distances, etc.) for each page in a website. The designers build website frame structures, looks, and events through the web page style designs.

Currently, the number of styles that web pages draw upon are increasing. Each time a web page is opened, a plurality of style content files is loaded by the web page to be used in displaying of the web page. The loading of the plurality of style content files results in the following: when a web page draws upon a file with content having too many styles, performance suffers and user experience is diminished. For example, when a web page drawing upon ten style resources (e.g., different stylesheets, javascripts, etc.) uses a conventional method for acquiring style resources, ten web page style requests are sent to a server in order to acquire corresponding style content and each style request includes a different URL for acquiring a style content. The web page is rendered and displayed according to the acquired style content of the ten style resources. In addition, each time the web page is opened, the style content is to be loaded ten times, thus reducing display speed of the web page and diminishing the user experience.

BRIEF DESCRIPTION OF THE DRAWINGS

Various embodiments of the invention are disclosed in the following detailed description and the accompanying drawings.

The purpose of the drawings described here is to provide further understanding of the present application, and they constitute a part of the present application. The illustrative embodiments of the present application and their descriptions are for explaining the present application and do not constitute improper restrictions on the present application. In the figures.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method for merging web page style addresses is provided. The method includes receiving a web page request from a terminal, determining web page content data corresponding to the web page request based on the web page request, analyzing the web page content data to obtain a plurality of style data, extracting from the plurality of style data style addresses and style attributes of the corresponding style data, and merging a plurality of style addresses to obtain one or more composite style addresses. In some embodiments, the number of the one or more composite style addresses is less than the number of the plurality of style addresses.

Figure 1:
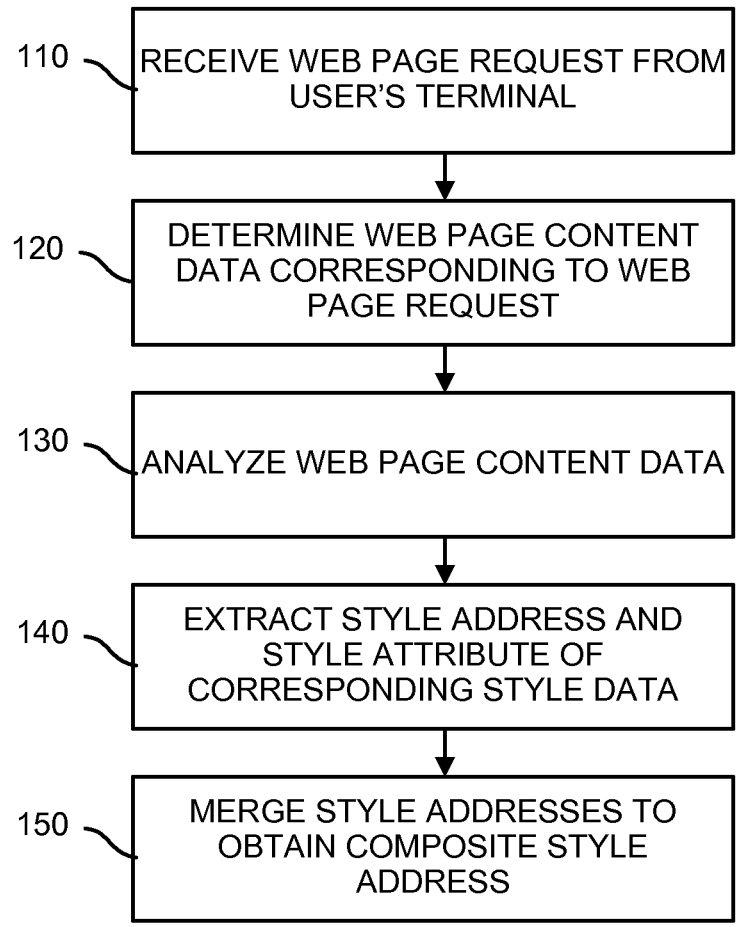
FIG. 1 is a flowchart of an embodiment of a process for merging web page style addresses.

FIG. 1 is a flowchart of an embodiment of a process for merging web page style addresses. In some embodiments, the process 100 is implemented by a server 610 of FIG. 6.

While using the Internet, a user can open a web page for browsing relevant content via a browser. At this point, the user's terminal sends a web page request to a web server. In some embodiments, the web page request is in a form that satisfies HyperText Transfer Protocol (HTTP), or is in the form of another transfer protocol understood by persons of ordinary skill in the art. In addition, in some embodiments, the web page request includes page address information or a URL for the web page. The web page request requests the web server to send addresses for a plurality of styles within the web page back to the user's terminal and the user's terminal uses the addresses for the plurality of styles to load style content indicated by the addresses. Examples of addresses of style within a webpage include http://style.china.alibaba.com/a.js (Javascript) and http://style.china.alibaba.com/a.css (CSS).

In 110, the server receives a web page request from a user's terminal.

In 120, the server determines web page content data corresponding to the web page request based on the web page request. In some embodiments, the web page request includes page address information, and the server performs a query in a first database based on the page address information to determine the web page content data corresponding to the web page request. The web page content data likewise satisfies HTTP or a protocol form corresponding to the web page request. In addition, in some embodiments, the web page content data includes HyperText Markup Language (HTML) code, scripting language code, and other code statements. The code statements are used to describe a plurality of original style data in the web page content data. Each piece of the original style data includes a data tag, a style attribute, a style address, and other such information.

In 130, after the server determines the web page content data corresponding to the web page request, the server analyzes the web page content data to obtain a plurality of style data.

The web page content data includes the plurality of original style data. Analyzing the web page content data means that the server determines whether the web page content data is correct and complete. For example, the server analyzes code statement format, data tags, etc., of each piece of the original style data. During the analysis process, the server determines which piece, if any, of the original style data reveals an error, is incomplete, or a combination thereof. In some embodiments, pieces of the original style data which are correct and complete are used in subsequent operations. Correct and complete pieces of the original style data are called style data, and the plurality of style data is obtained from the correct and complete pieces of the original style data.

For example, the server looks up code statements included in the web page content data that include a <link> tag or a <script> tag, checks and analyzes each code statement including the <link> tag or the <script> tag, and determines whether a checked and analyzed code statement describes one piece of style data (code statement that is correct and complete). Take the following code statement as an example:

Statement 1: <link href="http://style.china.alibaba.com/a.css" rel="stylesheet"/>

First, the formatting of the code statement is checked. Specifically, the server checks whether the <link> tag includes the "href" attribute. In the event that the server determines that the <link> tag includes the "href" attribute, the server checks whether the data tag includes rel="stylesheet." In the event that the data tag includes rel="stylesheet," the server then checks whether http://style.china.alibaba.com/a.css has style address information that meets a set of requirements. For example, the set of requirements include that the server domain name of the style address is correct. As an example, a domain is configured based on a configuration file, which specifies which domains are to be identified. Also, domain names that are not found in the configuration file are ignored. In the event that the style address complies with the set of requirements, the server checks extension type of the style address. The server determines that the style address has a ".css" extension.

Statement 2: <script src="http://style.china.alibaba.com/ajs"></script>

Similar to the process for analyzing statement 1, first the server checks the formatting of the code statement by checking whether a <script> tag includes an "src" attribute. In the event that the <script> tag includes the "src" attribute, the server checks whether the code statements end with </script>. In the event that the code statements end with </script>, the code statement is correct and the server checks whether the style address http://style.china.alibaba.com/ajs complies with a set of requirements. In the style address http://style.china.alibaba.com/ajs, the server determines whether the style address is correct based on whether the URL corresponding to the style address has a ".js" extension. Assuming that the style address complies with the set of requirements, the server checks extension type of the style address, and determines that the style address has a ".js" extension.

In the event that the code statement is determined to be complete and correct, the server determines the code statement to be one piece of style data. In the event that the analysis process reveals the code statement to have an error, the server stops the analysis of the code statement, and analysis is performed on a next code statement. In this way, the server analyzes the web page content data, and obtains a plurality of style data. Each piece of style data includes a style address and a style attribute.

In 140, the server extracts the corresponding style addresses and style attributes from the plurality of style data. In other words, in the event that analysis shows that a code statement describes one piece of style data, the server extracts a style address and a style attribute from the code statement of the corresponding piece of style data. In other words, the style data in the analyzed web page content data undergoes data re-processing to obtain the style addresses and style attributes. At this point, the analyzed web page content data is called style analysis data. This style analysis data can correspond to the plurality of style data (correct and complete original style addresses), and each piece of style data includes a style address and a style attribute. Style attributes can be used to group the style data and to merge a plurality of style addresses within the style data. Furthermore, operation 140 can be understood as merging the plurality of style addresses to achieve simplified code language results based on the style attributes.

In 150, after obtaining the style addresses and style attributes of the style data, the server merges a plurality of style addresses to obtain one or more composite style addresses. In some embodiments, the number of the composite style addresses is less than the number of the plurality of style addresses. As an example, the style data of the style analysis data is grouped according to values of the style attributes, and style addresses having the same style attribute value are merged.

After a plurality of style addresses in the style analysis data are merged, the server obtains composite style data. The composite style data includes one or more composite style addresses. The composite style addresses are style addresses that result from merging a plurality of style addresses according to the style attributes. In other words, the plurality of style addresses are merged according to the style attributes of the plurality of style addresses to obtain the composite style addresses.

The server groups the style data based on the style addresses of the style analysis data and then merges the style addresses according to the style attributes. Program Code 1 below is conventional style analysis data. The merging of the style data is explained using Program Code 1 as an example.

---
Program Code 1:
---
```
<html>
    <head>.....</head>
    <body>
        <link data-sc-pos="head" data-sc-group="group1"
href="http://style.china.alibaba.com/a.css" rel="stylesheet"/>
        <link data-sc-pos="head" data-sc-group="group1"
href="http://style.china.alibaba.com/b.css" rel="stylesheet"/>
        <script data-sc-pos="footer" data-sc-group="group2"
src="http://style.china.alibaba.com/a.js"></script>
        <script data-sc-pos="footer" data-sc-group="group2"
src="http://style.china.alibaba.com/b.js"></script>
    </body>
</html>
```
---

In some embodiments, the style analysis data includes two types of code language, CSS code and JS code. In this example, the CSS code is used to define two <link> statements while the JS code is used to define two <script> statements. Given the completeness and correctness of the code statements having the <link> tags and <script> tags, the style analysis data can include four pieces of style data.

In some embodiments, the four pieces of style data in the style analysis data are merged to obtain the composite style data, as shown below in Program Code 2. The code statements in Program Code 2 include two style attributes, i.e., a position attribute (data-sc-pos) and a group attribute (data-sc-group). The position attribute is used to indicate a position on the page where the current style address is to be placed following a merger, the details of which are described further below. For example, when data-sc-pos="head," the style address is placed within <head>${ . . . }<head> of the HTML code, and when data-sc-pos="footer," the style address is placed in front of ${ . . . }<body> of the HTML code. The group attribute is used to indicate the group to which the style address belongs. Group attribute values are used to differentiate between different groups. The group attribute is to be used together with the position attribute. If the group attribute is used alone, then the two types of style attributes will be overlooked.

In order to merge the style addresses according to groups in the style analysis data shown in Program Code 1, the style analysis data is first grouped based on the position attributes and then the grouped style analysis data is grouped based on the group attributes. In other words, the four pieces of style data in the style analysis data are grouped based on their position attributes and then their group attributes.

In the style analysis data, style addresses undergo a first grouping according to values of their position attributes (e.g., data-sc-pos="head," data-sc-pos="footer"). For example, statements having a position attribute that has a value "head" are grouped together, and statements having a position attribute that has a value "footer" are grouped together. Thus, obtaining style address groups based on the position attributes is possible. By grouping the style addresses based on their position attributes, distinguishing the sequence whereby web page styles are loaded is possible. The style address groups based on their position attributes then undergo a second grouping according to group attributes to obtain style address groups with the same group attribute values. Example of group attribute values are data-sc-group="group1" and data-sc-group="group2," and style addresses including data-sc-group="group1" are formed into a group, and style addresses including data-sc-group="group2" are formed into another group.

The style addresses of each group are merged to obtain a composite style address. Program Code 2 is the result of a merger of the four style addresses of the style analysis data.

---
Program Code 2:
---
```
<html>
<head>
<link href="http://style.china.alibaba.com/a|b.css" rel=
"stylesheet"/>
</head>
<body>
<script src=http://style.china.alibaba.com/a|b.js></script>
</body>
</html>
    where the statement <link data-sc-pos="head" data-sc-group=
"group1"href="http://style.china.alibaba.com/a.css" rel="stylesheet"/>
and
the statement <link data-sc-pos="head" data-sc-group="group1"
href="http://style.china.alibaba.com/b.css"
rel="stylesheet"/> in the style analysis data are merged to obtain <link
href="http://style.china.alibaba.com/a|b.css" rel="stylesheet"/>.
    The statements <script data-sc-pos="footer" data-sc-group=
"group2" src=http://style.china.alibaba.com/a.js></script> and <script
data-sc-pos="footer" data-sc-group="group2" src=
http://style.china.alibaba.com/b.js></script> are merged to obtain the
statement <script src=http://style.china.alibaba.com/a|b.js></script>.
```
---

Furthermore, if the code is composed of two or more code languages when style analysis data is merged, code-to-code mergers are to be performed separately. For example, Program Code 1 includes two types of code language: CSS code and JS code. During the merging operation, the statements compiled in CSS code are merged according to their group, and the statements compiled in JS code are merged according to their group. In other words, the JS statements and the CSS statements are separated into different groups, and the JS statements are merged into the JS group and the CSS statements are merged into the CSS group.

In the above example, the descriptions of Program Code 1 and Program Code 2 reveal that merged style analysis data only includes two style addresses, which is more concise than Program Code 1 or Program Code 2 alone. Please note that, before the merger, two statements of JS code exist, and after the merger, only a single statement http://style.china.alibaba.com/a|b.js exists so the merged statement is more concise. The conciseness of the merged Program Code 1 and Program Code 2 can reduce the frequency of server requests. In the event that the style analysis data includes many style addresses, the number of style addresses can be effectively reduced by using the above process to merge style addresses. The reduction in the number of style addresses can also reduce the frequency of exchanges between clients and servers.

In another embodiment, style analysis data can have a plurality of style data having different position attributes but having the same group attributes, or the style analysis data can have a plurality of style data with the position attributes of the plurality of style data being the same, but having different group attributes, as in the style analysis data shown in Program Code 3 below.

Program Code 3:

```
<html>
    <head>.....</head>
    <body>
        <link data-sc-pos = "head" data-sc-group="group1"
href="http://style.china.alibaba.com /c.css"   rel="stylesheet"/>
        <link data-sc-pos = "footer" data-sc-group="group1"
href="http://style.china.alibaba.com /d.css"   rel="stylesheet"/>
        <link data-sc-pos = "footer" data-sc-group="group1"
href="http://style.china.alibaba.com /e.css"   rel="stylesheet"/>
        <script data-sc-pos = "footer" data-sc-group="group3"
src="http://style.china.alibaba.com /c.js" ></script>
        <script data-sc-pos = "footer" data-sc-group="group4"
src="http://style.china.alibaba.com /d.js" ></script>
        <script data-sc-pos = "footer" data-sc-group="group4"
src="http://style.china.alibaba.com /e.js" ></script>
```

In Program Code 3, the style analysis data includes six pieces of style data. The first three pieces of style data include <link> tag codes with different values for the position attributes and the same value for the group attributes. The latter three pieces of style data include <script> tag codes with the same value for the position attribute and different values for the group attributes. Grouping is performed based on group attribute values. A first group is formed from style data including "group1," a second group is formed from style data including "group3," and a third group is formed from style data including "group4." The first group including "group1" has two position attribute values: "head" and "footer." The first value that appears is taken as authoritative, and subsequent values are disregarded. In other words, the position attribute with the value of "head" is regarded as authoritative, and the subsequent position attribute with the value of "footer" is disregarded. The style addresses in the group are merged to form a composite style address, and the composite style address is placed within <head>${ . . . }<head> of the HTML code. The position attribute value of both the second and third groups including "group3" or "group4" is "footer." Thus, after the style addresses of the second and third groups are merged to form a composite style address, the composite style address is placed in front of ${ . . . }<body> of the HTML code.

In another embodiment, the plurality of style data in the style analysis data is merged according to their groups. An example of the result is the composite style data shown in Program Code 4.

Program Code 4:

```
<html>
<head>
<link href="http://style.china.alibaba.com/
c|d|e.css"   rel="stylesheet"/>
</head>
<body>
<script src = "http://style.china.alibaba.com/c.js" ></script>
<script src = "http://style.china.alibaba.com/d|e.js" ></script>
</body>
</html>
```

In another embodiment, the style analysis data includes position attributes only, and the position attributes include different values. Groups are classified by the position attributes, as for example shown in Program Code 5. In one example, the groups are classified based on data-sc-group and data-sc-pos. In other example, the groups are classified based on data-sc-pos. In other words, the positions are a way of classifying the groups. For example, data-sc-pos=footer are grouped into one classification, data-sc-pos=head are grouped into another classification, and data-sc-pos=top are grouped into yet another classification. Since only three types of data-sc-pos exist, three classifications exist.

Program Code 5:

```
<html>
    <head>.....</head>
    <body>
        <link data-sc-pos = "head" href=
"http://style.china.alibaba.com/f.css" rel="stylesheet"/>
        <link data-sc-pos = "footer" href=
"http://style.china.alibaba.com/h.css" rel="stylesheet"/>
        <link data-sc-pos = "footer" href=
"http://style.china.alibaba.com/g.css" rel="stylesheet"/>
        <script data-sc-pos = "footer" src="http://style.china.alibaba.com/
f.js" ></script>
        <script data-sc-pos = "head" src="http://style.china.alibaba.com/
h.js" ></script>
        <script data-sc-pos = "footer" src="http://style.china.alibaba.com/
g.js" ></script>
```

When a merging operation is performed on this style analysis data according to a grouping, the grouping is performed based on the position attribute values only. In other words, style data including "head" is formed into one group, and style data including "footer" is formed into another group. Each group's style data is merged.

In this example, in the style analysis data, style data having the same value is composed of two code languages (CSS code and JS code). Therefore, no consideration is given to values of the position attributes between the two codes. The style addresses in the style data are separately grouped and merged to obtain composite style data, as shown in Program Code 6.

Program Code 6:

```
<html>
<head>
<link href="http://style.china.alibaba.com/f.css" rel="stylesheet"/>
<script src = "http://style.china.alibaba.com /h.js" ></script>
</head>
<body>
<link href="http://style.china.alibaba.com/h|g.css" rel="stylesheet"/>
<script src = "http://style.china.alibaba.com/f|g.js" ></script>
</body>
```

Style addresses in the style analysis data are merged according to the grouping to obtain composite style addresses. The merger reduces the number of style addresses and thus decreases terminal and server exchanges and reduces data processing load on the server.

After obtaining composite style data including the composite style address, the composite style data is sent to the user's terminal. The user's terminal receives the composite style data including the composite style address, and loads web page resources according to the composite style address included in the composite style data. After the user's terminal loading of the web page resources is completed, the user's terminal renders a web page. While rendering the web page, the browser renders the web page based on the style content. However, because the user's terminal does not include style content of the composite style address, the user's terminal is unable to properly render the web page. Therefore, the user's terminal should send a style rendering request to the server. The objective of the style rendering request is to request the server to transmit the style content corresponding to the composite style address back to the user's terminal. The style content includes: Cascading Style Sheets, JS code, etc. In addition, in some embodiments, the style content is located in a second database. In some embodiments, the Cascading Style Sheets and the JS code control page layout, fonts, color, background, distances, etc. The user's terminal performs the page rendering based on the style content.

Figure 2:
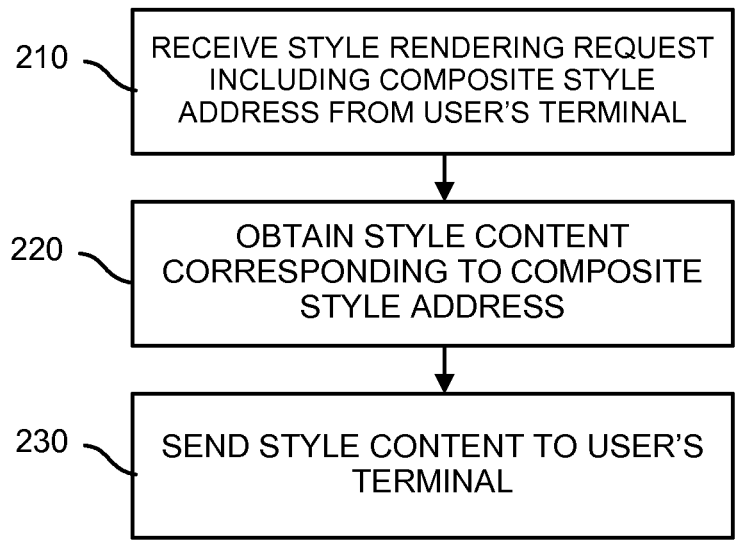
FIG. 2 is a flowchart of an embodiment of a process for acquiring style content.

FIG. 2 is a flowchart of an embodiment of a process for acquiring style content. In some embodiments, the process 200 is implemented by a server 610 of FIG. 6 and comprises:

In 210, the server receives a style rendering request from a user's terminal. The style rendering request includes a composite style address.

In 220, the server obtains style content corresponding to the composite style address based on the composite style addresses. In the event that the server accesses the style content, the server analyzes the composite style address. An analysis of the composite style address is shown in the following example:

In the statement <script src=http://style.china.alibaba.com/a|bjs></script>, the analysis determines that a server domain name included in the statement is "style.china.alibaba.com." The path for the style content to be acquired is "/a|bjs." The composite style address begins at the third forward slash "/" and the pipe "|," and the parser on the server breaks the merged part "a|bjs" into address segment "a.js" and address segment "b.js." Each address segment corresponds to a style address.

Furthermore, the composite style address is analyzed and segmented into a plurality of address segments, with each address segment corresponding to one style address among the plurality of style addresses. The plurality of address segments are used after they have been segmented to access a corresponding plurality of style content in the second database of the server. In other words, the plurality of style content is accessed based on the plurality of address segments. The style content includes: Cascading Style Sheets, JS code, etc. In some embodiments, the second database is a style database.

In 230, the server sends the style content to the user's terminal.

In another embodiment, the server gathers the plurality of style content of the plurality of address segments into a file, and causes the file to correspond to the composite style address corresponding to the plurality of address segments. The style content in the file is accessed through the entirety of composite style addresses to reduce the number of operations in the style content accessing process.

Figure 3:
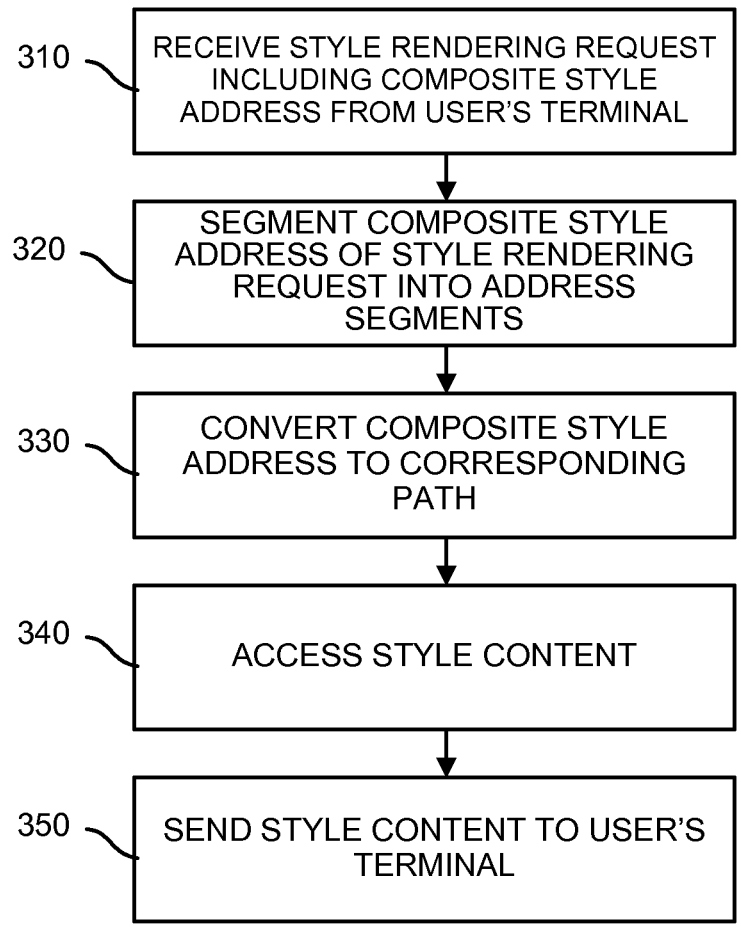
FIG. 3 is a flowchart of another embodiment of a process for acquiring style content.

FIG. 3 is a flowchart of another embodiment of a process for acquiring style content. In some embodiments, the process 300 is implemented by a server 610 of FIG. 6 and comprises:

In 310, the server receives a style rendering request from a user's terminal. The style rendering request includes a composite style address.

In 320, the server segments the composite style address included in the style rendering request into a plurality of address segments, and accesses a plurality of style content corresponding to the plurality of address segments.

In 330, the server converts the composite style address to a corresponding path. For example, an md5 algorithm is used to generate an md5 character string based on the path. For example, the path http://style.china.alibaba.com/a|b|c.js corresponds to the md5 character string "2ab1888e34caec2181beab4b34cc7444." A file is created in the second database, and the character string is used to name the file. This file serves as a file corresponding to the composite style address. In some embodiments, the file is used to store the plurality of style content. This operation can be summarized as follows: Create a file corresponding to the composite style address, and store the plurality of style content into the file. The md5 algorithm encrypts a segment of data into a 32-bit-long character string text, e.g., ef8dead9cce9da95277431aa12291634_4371893471.js. This character string text is unique. In other words, character string texts generated from different composite style addresses are each different.

In 340, the server queries the file corresponding to the composite style address, and accesses the style content of the file.

In 350, the server sends the style content to the user's terminal.

Subsequently, the user's terminal renders a web page according to the received style content and ultimately displays the rendered web page.

In some embodiments, an independent server or multiple servers, such as a dynamic server and a style server, are used for the aforesaid server. The dynamic server stores web page content data corresponding to each web page address and is responsible for merging style addresses in the style analysis data according to the groupings. The style server stores style content corresponding to each style address and is capable of segmenting composite style addresses.

Conventionally, a user's terminal sends all of the style addresses in the style analysis data together to a server in order to acquire corresponding style content. By merging style addresses, a quantity of style addresses is reduced and thereby the frequency of network exchanges is effectively reduced and user satisfaction is increased.

Figure 4:
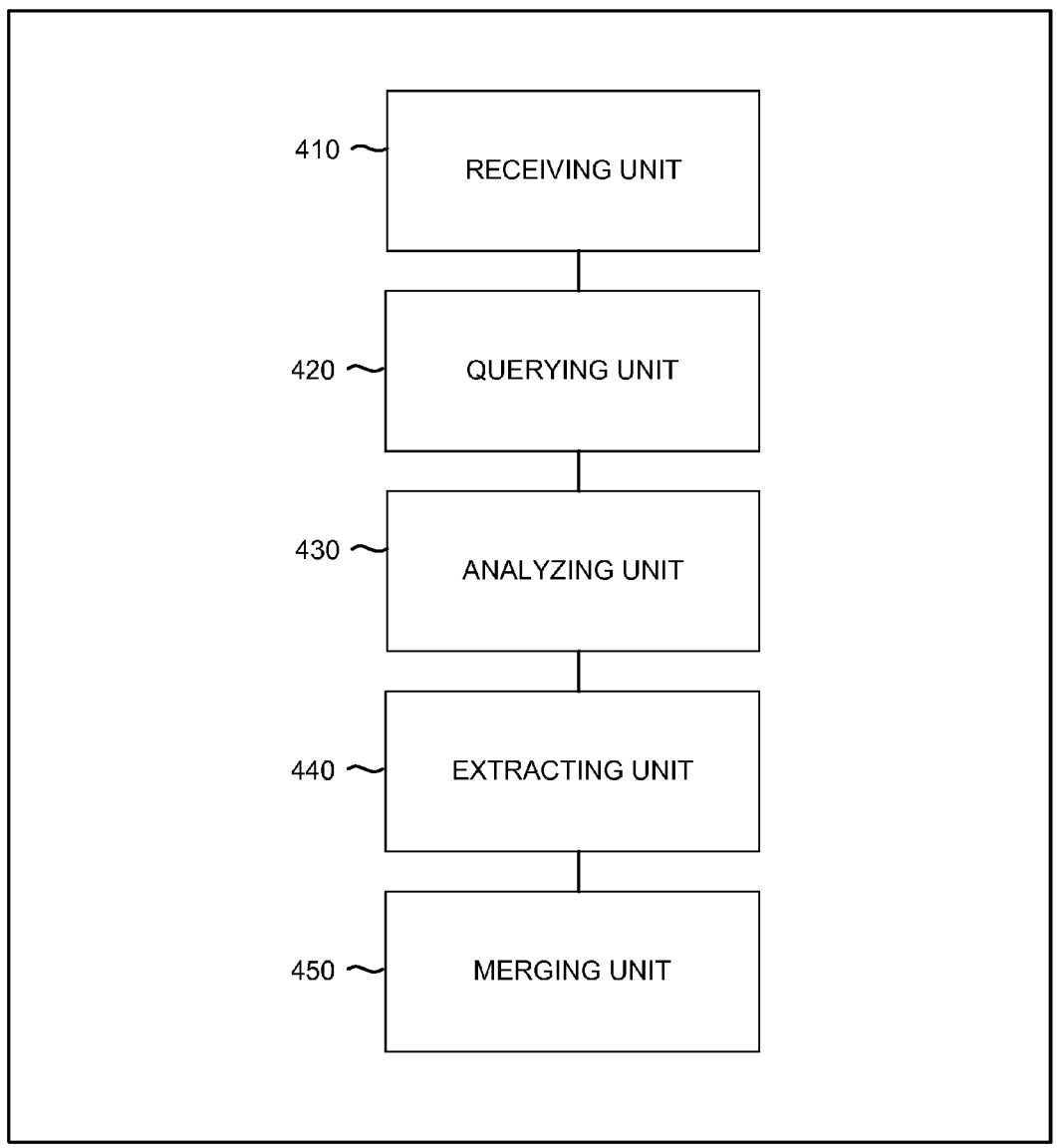
FIG. 4 is a diagram of an embodiment of a device for merging web page style addresses.

FIG. 4 is a diagram of an embodiment of a device for merging web page style addresses. In some embodiments, the device 400 performs processes 100, 200, and 300, and includes a receiving unit 410, a querying unit 420, an analyzing unit 430, an extracting unit 440, and a merging unit 450.

The receiving unit 410 receives web page requests from user terminals.

The web page request, which is sent out when the terminal opens a web page, includes page address information.

The querying unit 420 determines web page content data based on the web page requests.

The analyzing unit 430 analyzes the web page content data and locates style data in the web page content data.

The extracting unit 440 extracts style addresses and style attributes in the style data.

The merging unit 450 merges style addresses according to the style addresses and the style attributes in the corresponding style data.

The page address information included in the web page request determines one piece of web page content data corresponding to the web page request in a first database of the server. This web page content data includes a plurality of original style data. Each piece of the original style data includes a data tag, a style attribute, a style address, and other such information.

The analyzing unit 430 analyzes the web page content data to obtain a plurality of style data.

The analyzing unit 430 analyzes each piece of the original style data in the web page content data and assesses correctness and completeness of each piece of the original style data. The analyzing unit 430 skips original style data that has erroneous, incomplete, or a combination thereof. Correct and complete original style data is determined to be style data.

Web page content data that has been analyzed is determined to be style analysis data. The style analysis data includes a plurality of style data.

The extracting unit 440 extracts style addresses and style attributes from the plurality of style data. Thus, the extracting unit 440 is able to obtain a plurality of style addresses and a plurality of style attributes.

The merging unit 450 merges the plurality of style addresses to obtain one or more composite style addresses. In some embodiments, a number of composite style addresses is less than a number of the style addresses.

In some embodiments, since the extracting unit 440 extracts the style addresses and the style attributes of the corresponding style data, the merging unit 450 merges the plurality of style addresses based on the style attributes of the plurality of style addresses to obtain the one or more composite style addresses.

In some embodiments, because the plurality of style addresses are merged, the resulting number of composite style addresses is less than a number of the plurality of style addresses. Thus, the frequency of data exchanges between servers and terminals can be reduced.

The merging unit 450 sends the composite style addresses to the user's terminal.

Because the user's terminal does not have the style content relating to the composite style addresses, the user's terminal cannot render a web page using the one or more composite style addresses. Therefore, the user's terminal can send another request to the server. This request corresponds to a style rendering request.

The receiving unit 410 receives the style rendering request from the user's terminal. The style rendering request includes the one or more composite style addresses.

The querying unit 420 accesses style content based on the one or more composite style addresses.

In some embodiments, the querying unit 420 further comprises: a segmenting unit and an accessing unit.

Figure 5:
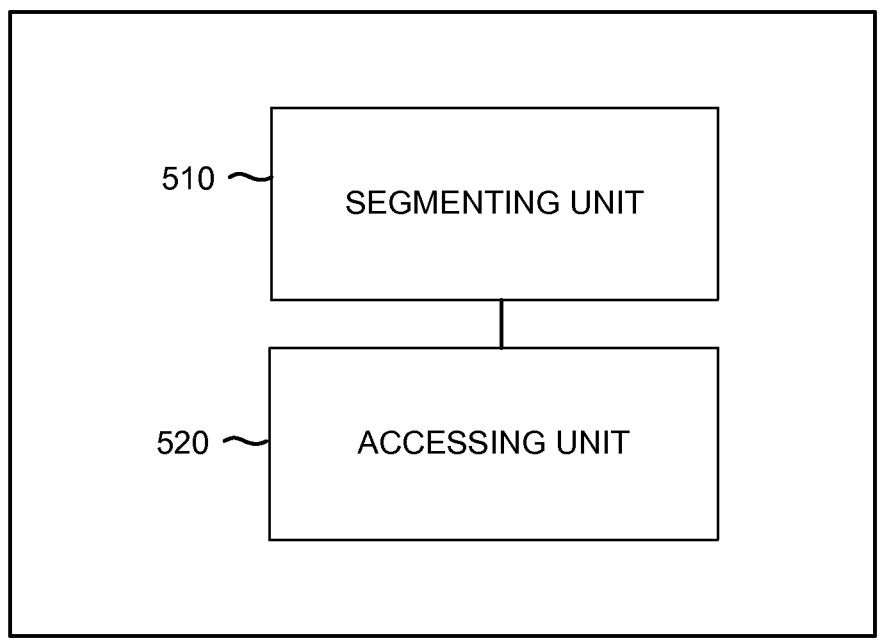
FIG. 5 is a diagram of an embodiment of a querying unit.

FIG. 5 is a diagram of an embodiment of a querying unit. In some embodiments, the querying unit 500 is an implementation of the querying unit 420 of FIG. 4 and comprises a segmenting unit 510 and an accessing unit 520.

The segmenting unit 510 segments a composite style address into a plurality of address segments. In some embodiments, each address segment corresponds to one style address among the plurality of style addresses.

The accessing unit 520 accesses a plurality of style content based on the plurality of address segments.

Referring back to FIG. 4, the merging unit 450 sends the plurality of style content to the user's terminal.

In another embodiment, the querying unit 420 further creates one file based on the analyzed composite style address. In some embodiments, the querying unit 420 stores the plurality of style content into the file.

The receiving unit 410 again receives a style rendering request from the user's terminal. Referring back to FIG. 5, the segmenting unit 510 analyzes the one or more composite style address in the style rendering request. The accessing unit 520 accesses the style content in the file by querying the file corresponding to the composite style addresses.

Referring back to FIG. 4, the merging unit 450 sends the style content in the file to the user's terminal.

Figure 6:
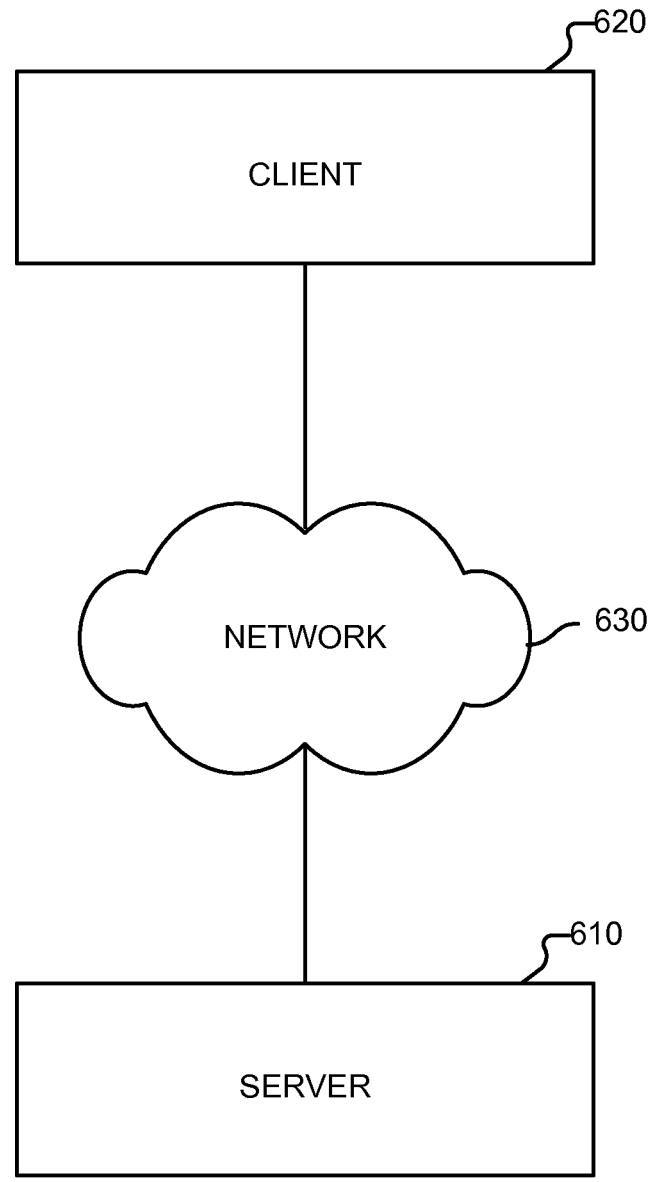
FIG. 6 is a diagram of an embodiment of a system for merging web page style addresses.

FIG. 6 is a diagram of an embodiment of a system for merging web page style addresses. In some embodiments, the system 600 includes a server 610 connected to a client 620 via a network 630. The client 620 can be a laptop computer, a desktop computer, a tablet, a mobile device, a smart phone, a wearable networking device, or any other appropriate computing device. In some embodiments, a web browser or a standalone application is installed at each client 620 and enables a user to access a web page hosted by the server 610.

A user using the client 620 opens the web page via the web browser. The client 620 sends a request across the network 630 to the web server 610. The server performs, for example, process 100 and returns one or more composition style addresses back to the client 620. In some embodiments, the client 620 sends another request to the server 610. The server performs process 200 or 300 to acquire style content and sends the acquired style content back to the client 620.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for merging web page style addresses, comprising:
receiving a web page request from a client terminal;
determining web page content data based on the web page request;
extracting a plurality of pieces of style data from the web page content data, each piece of the style data including a style address and at least two style attributes, the at least two style attributes including a first style attribute and a second style attribute; and
merging a plurality of style addresses to obtain one or more composite style addresses, comprising:
grouping, based on the first style attribute, a first plurality of style addresses of the plurality of pieces of style data into at least a first group of style addresses and a second group of style addresses;
grouping, based on the second style attribute, one or more style addresses of the first group of style addresses into at least a first subgroup of style addresses and a second subgroup of style addresses, the first style attribute being different from the second style attribute;

grouping, based on the second style attribute, one or more style addresses of the second group of style addresses into at least a third subgroup of style addresses and a fourth subgroup of style addresses; and merging a first plurality of style addresses from one of the first subgroup, the second subgroup, the third subgroup, or the fourth subgroup into a composite style address, style addresses of the first plurality of style addresses being from the same subgroup.

2. The method as described in claim 1, wherein the merging of the plurality of style addresses comprises:

merging the plurality of style addresses based on style attributes of the style data relating to the plurality of style addresses to obtain the one or more composite style addresses; and sending the one or more composite style addresses to the client terminal.

3. The method as described in claim 2, wherein the merging of the plurality of style addresses further comprises:

receiving a style rendering request from the client terminal, wherein the style rendering request includes the one or more composite style addresses;

accessing style content based on the one or more composite style addresses; and sending the style content to the client terminal.

4. The method as described in claim 3, wherein the accessing of the style content comprises:

analyzing the one or more composite style addresses;

segmenting the one or more composite style addresses into a plurality of address segments, each address segment corresponding to one style address;

accessing a plurality of style content based on the plurality of address segments;

creating a file corresponding to the one or more composite style addresses; and storing the plurality of style content in the file.

5. The method as described in claim 4, wherein the accessing of the style content corresponding to the one or more composite style addresses comprises:

determining whether the file corresponding to the one or more composite style addresses exists; and in the event that the file exists, querying the file to access the plurality of style content of the file.

6. The method as described in claim 1, wherein a number of the one or more composite style addresses is fewer than a number of the plurality of style addresses.

7. The method as described in claim 1, wherein:

the first style attribute relates to a position attribute, a group attribute, or a type attribute; and the second style attribute relates to a position attribute, a group attribute, or a type attribute.

8. A device for merging web page style addresses, comprising:

at least one processor configured to:

receive a web page request from a client terminal;

determine web page content data based on the web page request;

extract a plurality of pieces of style data from the web page content data, each piece of the style data including a style address and at least two style attributes, the at least two style attributes including a first style attribute and a second style attribute; and merge a plurality of style addresses to obtain one or more composite style addresses, comprising to:

group, based on the first style attribute, a first plurality of style addresses of the plurality of pieces of style data into at least a first group of style addresses and a second group of style addresses;

group, based on the second style attribute, one or more style addresses of the first group of style addresses into at least a first subgroup of style addresses and a second subgroup of style addresses, the first style attribute being different from the second style attribute;

group, based on the second style attribute, one or more style addresses of the second group of style addresses into at least a third subgroup of style addresses and a fourth subgroup of style addresses; and merge a first plurality of style addresses from one of the first subgroup, the second subgroup, the third subgroup, or the fourth subgroup into a composite style address; address, style addresses of the first plurality of style addresses being from the same subgroup; and a memory coupled to the one processor and configured to provide the one processor with instructions.

9. The device as described in claim 8, wherein the merging of the plurality of style addresses comprises:

merge the plurality of style addresses based on style attributes of the style data relating to the plurality of style addresses to obtain the one or more composite style addresses; and send the one or more composite style addresses to the client terminal.

10. The device as described in claim 9, wherein the merging of the plurality of style addresses further comprises:

receive a style rendering request from the client terminal, wherein the style rendering request includes the one or more composite style addresses;

access style content based on the one or more composite style addresses; and send the style content to the client terminal.

11. The device as described in claim 10, wherein the accessing of the style content comprises:

analyze the one or more composite style addresses;

segment the one or more composite style addresses into a plurality of address segments, each address segment corresponding to one style address;

access a plurality of style content based on the plurality of address segments;

create a file corresponding to the one or more composite style addresses; and store the plurality of style content in the file.

12. The device as described in claim 11, wherein the accessing of the style content corresponding to the one or more composite style addresses comprises:

determine whether the file corresponding to the one or more composite style addresses exists; and in the event that the file exists, query the file to access the plurality of style content of the file.

13. The device as described in claim 8, wherein a number of the one or more composite style addresses is fewer than a number of the plurality of style addresses.

14. A computer program product for merging web page style addresses, the computer program product being embodied in a tangible non-transitory computer readable storage medium and comprising computer instructions for:

receiving a web page request from a client terminal;
determining web page content data based on the web page request;
extracting a plurality of pieces of style data from the web page content data, each piece of the style data including a style address and at least two style attributes, the at least two style attributes including a first style attribute and a second style attribute; and
merging a plurality of style addresses to obtain one or more composite style addresses, comprising:
  grouping, based on the first style attribute, a first plurality of style addresses of the plurality of pieces of style data into at least a first group of style addresses and a second group of style addresses;
  grouping, based on the second style attribute, one or more style addresses of the first group of style addresses into at least a first subgroup of style addresses and a second subgroup of style addresses, the first style attribute being different from the second style attribute;
  grouping, based on the second style attribute, one or more style addresses of the second group of style addresses into at least a third subgroup of style addresses and a fourth subgroup of style addresses; and
  merging a first plurality of style addresses from one of the first subgroup, the second subgroup, the third subgroup, or the fourth subgroup into a composite style address, style addresses of the first plurality of style addresses being from the same subgroup.

* * * * *

UNITED STATES PATENT AND TRADEMARK OFFICE
CERTIFICATE OF CORRECTION

PATENT NO.         : 9,563,611 B2
APPLICATION NO.    : 14/219932
DATED              : February 7, 2017
INVENTOR(S)        : Zhiwen Mi It is certified that error appears in the above-identified patent and that said Letters Patent is hereby corrected as shown below:

In the Claims

In Column 14, Line 22, delete "address;".

In Column 14, Line 25, after "a memory coupled to the" insert --at least--.

In Column 14, Line 26, after "provide the" insert --at least--.

Signed and Sealed this
Third Day of October, 2017

Joseph Matal
*Performing the Functions and Duties of the*
*Under Secretary of Commerce for Intellectual Property and*
*Director of the United States Patent and Trademark Office*